UNITED STATES PATENT OFFICE.

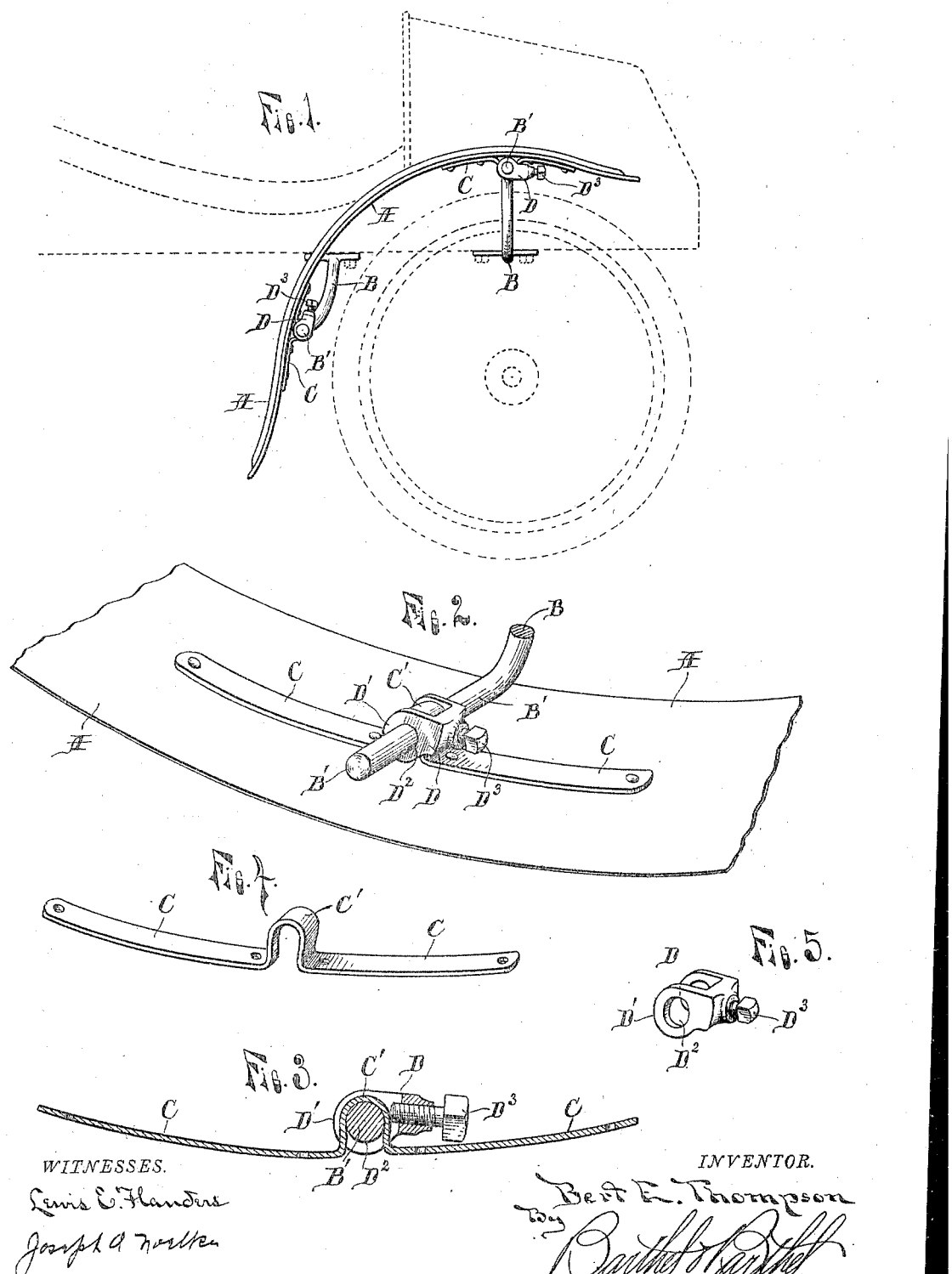

BERT E. THOMPSON, OF DETROIT, MICHIGAN, ASSIGNOR TO THE WILSON & HAYES MFG. CO., OF DETROIT, MICHIGAN.

MUD-GUARD FASTENING.

No. 817,203.

Specification of Letters Patent.

Patented April 10, 1906.

Application filed October 17, 1904. Serial No. 228,688.

*To all whom it may concern:*

Be it known that I, BERT E. THOMPSON, a citizen of the United States of America, residing at Detroit, in the county of Wayne and State of Michigan, have invented certain new and useful Improvements in Mud-Guard Fastenings, of which the following is a specification, reference being had therein to the accompanying drawings.

This invention relates to improved means for securing mud-guards to their supporting-brackets; and its object is to provide means for so securing the guard to its bracket that it will not become loosened by the constant jar and vibration and so that it may be readily adjusted laterally or detached.

It is also an object of the invention to so construct the device that it forms a support and strengthening-strip for the guard, extending any desired distance longitudinally thereof, thus affording ample opportunity for securing the same to the guard and to provide certain other new and useful features, all as hereinafter more fully described and shown in the accompanying drawings, in which—

Figure 1 is a side elevation of a device embodying the invention; Fig. 2, a perspective detail of the device, showing the same inverted and attached to the under side of a section of the mud-guard; Fig. 3, a longitudinal section of the fastening; Fig. 4, a perspective view of the strap, and Fig. 5 a perspective view of the clamp.

As shown in the drawings, A is a mud-guard of any ordinary form and construction, and B represents brackets for supporting the guard, said brackets being attached to the vehicle in any desired manner at one end and at their opposite ends formed with a straight round portion B'.

The guard is adjustably and detachably secured to the end B' by riveting or bolting a strap C, having a loop C' intermediate its ends, to the under side of the guard, said strap extending longitudinally of the guard a sufficient distance to furnish ample opportunity for securing the same to the guard and to strengthen and support the same, and a clamp D is provided with ears D' to embrace the loop C', through which loop and through openings D² in the ears the end of the bracket extends. A set-screw D³ extends through a screw-threaded opening in the clamp between the ears and engages the loop C', the screw thus operating to firmly bind or clamp the rounded end of the bracket between one side of the loop and the ears of the clamp through which it passes.

The clamp is preferably turned to bring the head of the clamping-screw close to the guard, so that it cannot strike and injure the tire, the clamp presenting a smooth rounded under surface which will not injure the tire if brought in contact with it by the vibration of the axle.

When the clamping-screw is turned up hard against the loop, its tendency to become loosened by the vibrations is slight, and by loosening the set-screw the guard may be slipped off or adjusted to the proper position over the wheel, thus obviating the necessity of forming the brackets with accuracy and also saving much time and trouble in securing the guards in place or removing the same.

Having thus fully described my invention, what I claim is—

1. The combination with a mud-guard, of a bracket having an end extending across the guard, a loop secured to the guard and embracing the end of the bracket, and a bifurcated clamp embracing the loop and provided with openings to receive said end.

2. The combination with a mud-guard, of a bracket having an end extending transversely of the guard, a strap extending longitudinally of the guard and secured thereto and provided with a loop intermediate its ends to receive and embrace the end of the bracket, a clamp having ears embracing the loop, said ears being provided with openings to receive said bracket end, and a set-screw extending through a screw-threaded opening in the clamp between said ears to engage the loop.

In testimony whereof I affix my signature in presence of two witnesses.

BERT E. THOMPSON.

Witnesses:
 OTTO F. BARTHEL,
 LEWIS E. FLANDERS.